US010254628B2

(12) United States Patent
Ono

(10) Patent No.: US 10,254,628 B2
(45) Date of Patent: Apr. 9, 2019

(54) LENS HOOD AND IMAGING DEVICE

(71) Applicant: FUJIFILM Corporation, Tokyo (JP)

(72) Inventor: Shuji Ono, Tokyo (JP)

(73) Assignee: FUJIFILM Corporation, Tokyo (JP)

( * ) Notice: Subject to any disclaimer, the term of this patent is extended or adjusted under 35 U.S.C. 154(b) by 117 days.

(21) Appl. No.: 15/425,376

(22) Filed: Feb. 6, 2017

(65) Prior Publication Data

US 2017/0146888 A1 May 25, 2017

Related U.S. Application Data

(63) Continuation of application No. PCT/JP2015/071355, filed on Jul. 28, 2015.

(30) Foreign Application Priority Data

Aug. 29, 2014 (JP) ................................ 2014-175443

(51) Int. Cl.
*G02B 13/02* (2006.01)
*G02B 5/00* (2006.01)
(Continued)

(52) U.S. Cl.
CPC ............ *G03B 11/045* (2013.01); *G02B 5/003* (2013.01); *G02B 13/02* (2013.01); *G03B 11/04* (2013.01); *H04N 5/225* (2013.01)

(58) Field of Classification Search
CPC .......... G02B 5/00; G02B 5/003; G02B 5/045; G02B 5/04; G02B 13/02; G02B 17/08;
(Continued)

(56) References Cited

U.S. PATENT DOCUMENTS 4,166,678 A 9/1979 Schrader
4,929,055 A * 5/1990 Jones ...................... G02B 5/00 359/601
(Continued)

FOREIGN PATENT DOCUMENTS

DE 26 40 370 A1 3/1978
DE 20 2012 010 400 U1 12/2012
(Continued)

OTHER PUBLICATIONS

English translation of JP S61149938, machine translated on Jun. 19, 2018.*
(Continued)

*Primary Examiner* — Jie Lei
(74) *Attorney, Agent, or Firm* — Studebaker & Brackett PC

(57) ABSTRACT

The invention provides a lens hood and an imaging device in which a lens hood can be reduced in length while light unnecessary to pick up an image is blocked and the blocking of an effective light beam necessary to pick up an image can be minimized. A lens hood, which blocks unnecessary light to be incident on a telephoto lens, according to an aspect of the invention includes a first light blocking wall that forms a cylindrical outermost periphery, and a concentric second light blocking wall that partitions an internal space of the first light blocking wall into a plurality of spaces. Each of the first and second light blocking walls is provided in parallel to the traveling direction of an effective light beam used to form a subject image within an angle of view of the telephoto lens, and blocks unnecessary light other than the effective light beam.

9 Claims, 15 Drawing Sheets

(51) Int. Cl.
*G03B 11/04* (2006.01)
*H04N 5/225* (2006.01)

(58) Field of Classification Search
CPC .... G02B 17/086; G03B 11/04; G03B 11/045; H04N 5/225
USPC ................. 359/611, 613, 615, 721, 726, 727
See application file for complete search history.

(56) References Cited

U.S. PATENT DOCUMENTS

| | | | | |
|---|---|---|---|---|
| 7,764,440 | B2 * | 7/2010 | Border | G02B 17/0896 359/721 |
| 2004/0151492 | A1 | 8/2004 | Blok et al. | |
| 2015/0338606 | A1 * | 11/2015 | Ono | H04N 5/2259 348/322 |

FOREIGN PATENT DOCUMENTS

| | | | |
|---|---|---|---|
| JP | S61-149938 | A | 7/1986 |
| JP | 2003-241260 | A | 8/2003 |
| JP | 2011-505022 | A | 2/2011 |
| JP | 2012-252177 | A | 12/2012 |
| WO | 02/075447 | A1 | 9/2002 |
| WO | 2014/129216 | A1 | 8/2014 |

OTHER PUBLICATIONS

International Search Report issued in PCT/JP2015/071355; dated Oct. 20, 2015.

International Preliminary Report on Patentability issued in PCT/JP2015/071355; dated Feb. 24, 2016.

An Office Action; "Notification of Reasons for Refusal" issued by the Japanese Patent Office dated Apr. 27, 2017, which corresponds to Japanese Patent Application No. 2014-175443 and is related to U.S. Appl. No. 15/425,376; with English language translation.

The partial supplementary European search report issued by the European Patent Office dated May 9, 2017, which corresponds to European Patent Application No. 15835048.8-1568 and is related to U.S. Appl. No. 15/425,376.

Adam Greenbaum et al.; "Low-mass high-performance deployable optical baffle for CubeSats"; Aerospace Conference; Mar. 2, 2013; pp. 1-12; XP032397022; ISBN: 978-1-4673-1812-9.

The extended European search report issued by the European Patent Office dated Aug. 14, 2017, which corresponds to European Patent Application No. 15835048.8-1568 and is related to U.S. Appl. No. 15/425,376.

Communication Pursuant to Article 94(3) EPC issued by the European Patent Office dated Mar. 26, 2018, which corresponds to European Patent Application No. 15 835 048.8-1022 and is related to U.S. Appl. No. 15/425,376.

* cited by examiner

LENS HOOD AND IMAGING DEVICE

CROSS-REFERENCE TO RELATED APPLICATIONS

This application is a Continuation of PCT International Application No. PCT/JP2015/071355 filed on Jul. 28, 2015, which claims priority under 35 U.S.C. § 119(a) to Japanese Patent Application No. 2014-175443 filed on Aug. 29, 2014. Each of the above applications is hereby expressly incorporated by reference, in their entirety, into the present application.

BACKGROUND OF THE INVENTION

1. Field of the Invention

The invention relates to a lens hood and an imaging device, and more particularly, to a lens hood and an imaging device that block unnecessary light to be incident on a telephoto lens.

2. Description of the Related Art

When light unnecessary to pick up an image is incident on an imaging lens, the deterioration of the overall contrast, unnecessary light spots, the streak of light, flare, or the like of an image is caused. Accordingly, a cylindrical lens hood is generally mounted on the front end portion of the imaging lens in order to block unnecessary light entering the lens.

"General Form"

The shape of a general lens hood varies according to the angle of view of the imaging lens. From a functional object to block unnecessary light and not to block light necessary to pick up an image, a telephoto lens generally has a simple cylindrical shape but a wide-angle lens or a fisheye lens employs a shape, in which a part of a cylinder is cut out, to satisfy the above-mentioned condition. However, the lens hood in the related art has had a cylindrical shape as a basic shape.

The cylindrical lens hood needs to have a certain length in order to block unnecessary light that is to be incident in an oblique direction by the cylindrical lens hood.

In the case of a telephoto lens, only light, which is incident on the lens at an angle substantially right in front of the lens (an angle within an imaging angle of view) as shown in FIGS. 17A and 17B, is necessary light (an effective light beam). Further, since oblique light, which is incident on the lens at a large angle exceeding the imaging angle of view as shown in FIG. 17C, causes stray light by being reflected in a lens barrel, the oblique light is unnecessary. Accordingly, it is necessary to make the length of a cylindrical lens hood significantly long in order to block unnecessary oblique light, which is less inclined than an effective light beam as shown in FIG. 17D, by a cylindrical lens hood 1.

Since the focal length of a telephoto lens is generally long, a lens barrel tends to be very long. However, since the entire lens unit of a camera is significantly long if the lens hood is also long, it is apparent that it is not preferable that the lens hood is also long.

In the related art, lens hoods, which can be made short and can block unnecessary light not involved with the formation of an image, have been proposed (JP2012-252177A and JP1986-149938A (JP-S61-149938A)).

The lens hood disclosed in JP2012-252177A includes: a first hood part that is disposed not to block light flux, which is involved with the formation of an image, of light flux that is incident on the surface of a lens closest to an object in a case in which the lens is opened; and a second hood part that is disposed in the first hood part so as to block a part of light flux involved with the formation of an image. Further, the first hood part and the second hood part are concentrically provided, and an inner wall of the second hood part is disposed substantially in parallel to an optical axis.

JP1986-149938A (JP-S61-149938A) discloses lens hoods in which opaque light blocking walls are formed in the shape of a net and which have the shape of a grid, a rectangular shape, a polygonal shape, the shape of a honeycomb, a rhombic shape, and a circular shape in a plan view. Furthermore, JP1986-149938A (JP-S61-149938A) discloses a structure in which the sets of cross-sections of the opaque light blocking walls are parallel.

SUMMARY OF THE INVENTION

According to the lens hoods disclosed in JP2012-252177A and JP1986-149938A (JP-S61-149938A), light blocking walls having a concentric shape, the shape of a grid, and the like are provided in the internal space of a cylindrical hood forming the outermost periphery, and the lens hoods can be made short while unnecessary light not involved with the formation of an image is blocked by the light blocking walls.

However, since all the light blocking walls provided in the internal space of the hood are disposed in parallel to an optical axis, it is possible to make an effective light beam, which is parallel to the optical axis, not be blocked as much as possible. However, in the case of an effective light beam that is not parallel to the optical axis, there is a problem that an effective light beam to be blocked is increased with an increase in an angle between the optical axis and the effective light beam.

The invention has been made in consideration of the above-mentioned circumstances, and an object of the invention is to provide a lens hood and an imaging device in which a lens hood can be reduced in length (size) while light unnecessary to pick up an image is blocked and the blocking of an effective light beam necessary to pick up an image can be minimized.

In order to achieve the object, according to an aspect of the invention, there is provided a lens hood that blocks unnecessary light to be incident on a telephoto lens. The lens hood comprises: a first light blocking wall that forms a cylindrical outermost periphery; and a second light blocking wall that partitions an internal space of the first light blocking wall into a plurality of spaces. Each of the first and second light blocking walls is provided in parallel to the traveling direction of a first effective light beam used to form a subject image within an angle of view of the telephoto lens, and blocks first unnecessary light other than the first effective light beam.

According to the aspect of the invention, since the internal space of the first light blocking wall forming the cylindrical outermost periphery is partitioned into the plurality of spaces by the second light blocking wall, the aspect ratio of the longitudinal section of each partitioned space can be reduced. Accordingly, it is possible to block oblique light (unnecessary light) that is incident at a large angle exceeding an imaging angle of view, and to make the lengths of the first light blocking wall and the second light blocking wall (the lens hood) shorter than the length of an ordinary lens hood that is not provided with the second light blocking wall. Further, since each of the first and second light blocking walls is provided in parallel to the traveling direction of the first effective light beam used to form a subject image within the angle of view of the telephoto lens, it is possible to minimize the blocking of the first effective light beam while reliably blocking unnecessary light.

In a lens hood according to another aspect of the invention, it is preferable that the lens hood is applied to a reflective telephoto lens that includes a reflective optical system reflecting light flux twice or more and the second light blocking wall approaches an optical axis of the reflective telephoto lens in parallel to the optical axis with an increase in a distance between the second light blocking wall and a center of the optical axis of the reflective telephoto lens.

Since the reflective telephoto lens, which is one form of a telephoto lens, turns back an optical path, a lens having a long focal length can be reduced in size. However, when the lens hood according to the invention is applied to the reflective telephoto lens, the total length of the telephoto lens and the lens hood can be reduced. Further, in the case of the reflective telephoto lens, an effective light beam, which is incident on the peripheral portion of the lens, forms an image at the central portion on the image-forming surface and an effective light beam, which is incident on the central portion of the lens, forms an image at the peripheral portion on the image-forming surface. Accordingly, the second light blocking wall is provided so as to approach an optical axis of the reflective telephoto lens in parallel to the optical axis with an increase in a distance between the second light blocking wall and the center of the optical axis of the reflective telephoto lens.

In a lens hood according to still another aspect of the invention, it is preferable that the lens hood is applied to a multifocal lens including a wide-angle lens provided at a central portion and an annular telephoto lens provided at a peripheral portion of the wide-angle lens and the second light blocking wall is provided only in an annular internal space corresponding to the telephoto lens of the multifocal lens.

When a lens hood optimized for the telephoto lens is applied to the multifocal lens, the field of view of the wide-angle lens is obstructed. Accordingly, the second light blocking wall is provided only in the annular internal space corresponding to the telephoto lens of the multifocal lens.

In a lens hood according to still another aspect of the invention, it is preferable that each of the first and second light blocking walls does not block a second effective light beam, which is used to form a subject image within an angle of view of the wide-angle lens of the multifocal lens, and blocks second unnecessary light other than the second effective light beam. That is, the first and second light blocking walls are adapted not to obstruct the field of view of the wide-angle lens of the multifocal lens.

In a lens hood according to still another aspect of the invention, it is preferable that a height of each of the first and second light blocking walls varies in accordance with a distance between each light blocking wall and a center of an optical axis of the multifocal lens and each of the first and second light blocking walls does not block a second effective light beam, which is used to form a subject image within an angle of view of the wide-angle lens of the multifocal lens, and blocks second unnecessary light other than the second effective light beam. That is, since the height of each of the first and second light blocking walls varies in accordance with a distance between each light blocking wall and the center of the optical axis of the multifocal lens, each of the first and second light blocking walls can be made to have a height corresponding to the angle of view of the wide-angle lens of the multifocal lens and can be made not to obstruct the field of view of the wide-angle lens of the multifocal lens.

In a lens hood according to still another aspect of the invention, it is preferable that the height of each of the first and second light blocking walls varies in accordance with a distance between each light blocking wall and the center of the optical axis of the multifocal lens and an interval between adjacent light blocking walls of the first and second light blocking walls is reduced with a reduction in the height. When the heights of the first and second light blocking walls are reduced, unnecessary light (oblique light) is likely to be incident. Accordingly, the interval between the light blocking walls is reduced with a reduction in the height of the light blocking wall so that oblique light is not incident.

In a lens hood according to still another aspect of the invention, the second light blocking wall is formed so as to partition the internal space of the first light blocking wall in a concentric shape, the shape of a grid, the shape of a honeycomb, or a cylindrical shape.

In a lens hood according to still another aspect of the invention, it is preferable that antireflection treatment is performed on a wall surface of each of the first and second light blocking walls. Accordingly, the reflection of unnecessary light, which is blocked by the wall surfaces of the first and second light blocking walls, is prevented, and stray light and scattered light are removed and absorbed.

An imaging device according to still another aspect of the invention comprises the lens hood that has the above-mentioned structure the multifocal lens; and a directional sensor that includes a plurality of pixels formed of photoelectric conversion elements arrayed two-dimensionally, pupil-splits light flux to be incident through the wide-angle lens and the telephoto lens of the multifocal lens, and selectively receives light.

According to still another aspect of the invention, since a wide-angle image and a telescopic image are formed (pupil-split and individually formed) on the directional sensor through the wide-angle lens and the telephoto lens of the multifocal lens, respectively, the wide-angle image and the telescopic image can be simultaneously acquired from the directional sensor. Particularly, since light unnecessary for the telescopic image is blocked by the lens hood, a good telescopic image can be acquired.

In an imaging device according to still another aspect of the invention, the directional sensor may include a microlens array or a light blocking mask that functions as a pupil-split part.

According to the invention, since the internal space of the first light blocking wall forming the cylindrical outermost periphery is partitioned into the plurality of spaces by the second light blocking wall, it is possible to block oblique light (unnecessary light), which is incident at an angle exceeding the imaging angle of view of the telephoto lens, and to make the length of the lens hood shorter than the length of an ordinary lens hood that is not provided with the second light blocking wall. Further, since each of the first and second light blocking walls is provided in parallel to the traveling direction of the first effective light beam used to form a subject image within the angle of view of the telephoto lens, it is possible to minimize the blocking of the first effective light beam while reliably blocking unnecessary light.

DESCRIPTION OF THE PREFERRED EMBODIMENTS

Embodiments of a lens hood and an imaging device according to the invention will be described below with reference to the accompanying drawings.

First Embodiment of Lens Hood

Figure 1:
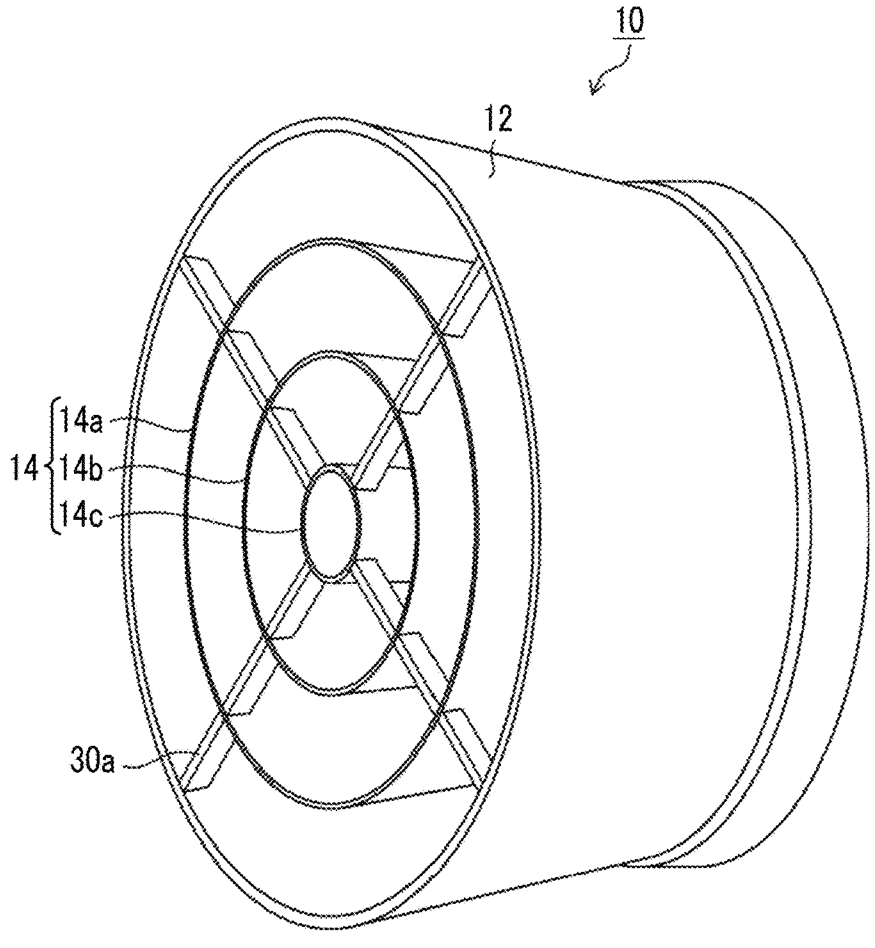
FIG. 1 is a perspective view showing a first embodiment of a lens hood according to the invention.
Figure 2:
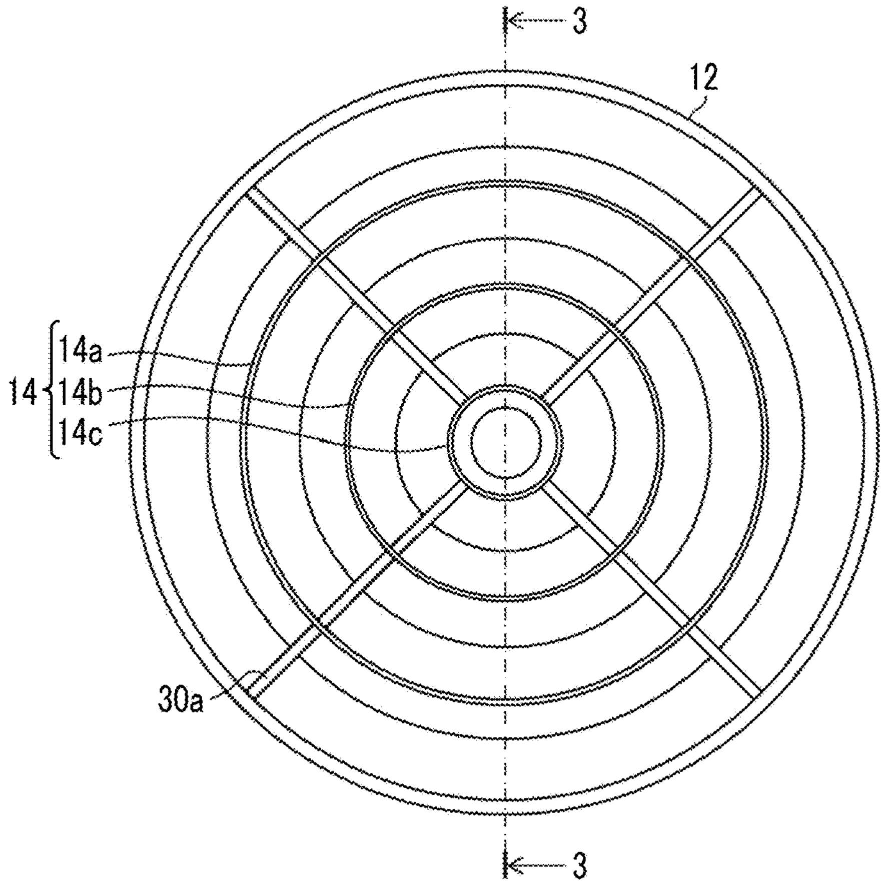
FIG. 2 is a front view of the lens hood shown in FIG. 1.
Figure 3:
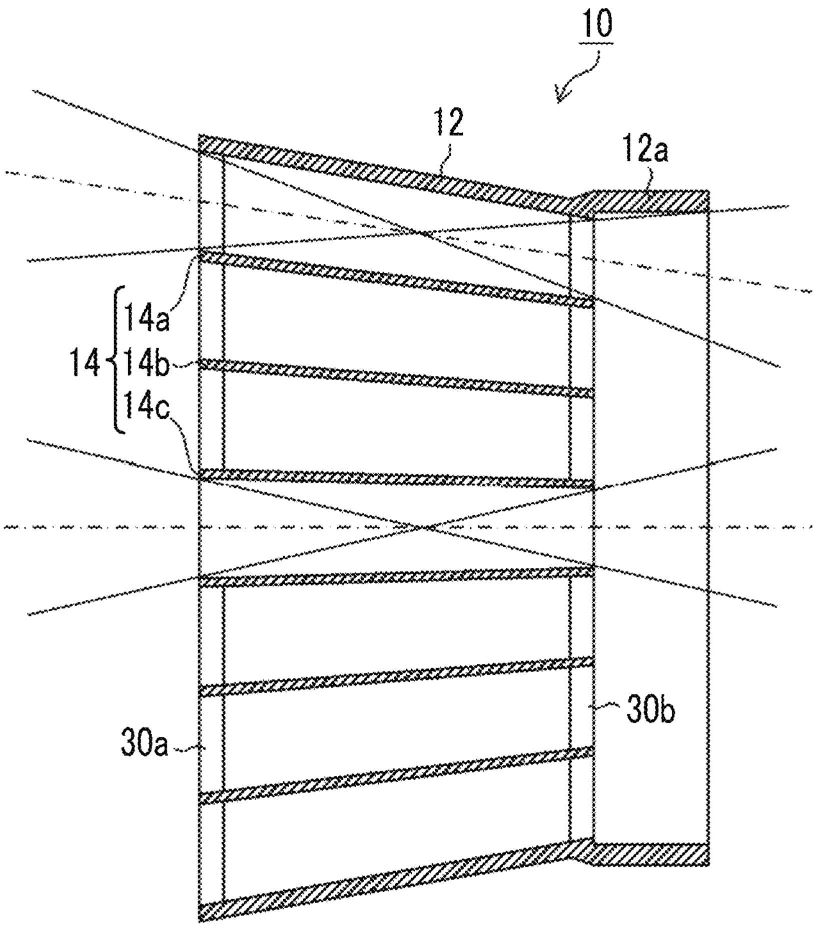
FIG. 3 is a sectional view taken along line 3-3 of FIG. 2.

FIG. 1 is a perspective view showing a first embodiment of a lens hood according to the invention, FIG. 2 is a front view of the lens hood shown in FIG. 1, and FIG. 3 is a sectional view taken along line 3-3 of FIG. 2.

As shown in FIGS. 1 to 3, a lens hood 10 of the first embodiment is a lens hood that is mounted on a general telephoto lens 2 (see FIGS. 4A, 4B, and 4C), and manly includes a first light blocking wall 12 that forms the cylindrical outermost periphery and cylindrical second light blocking walls 14 (in this embodiment, three second light blocking walls 14*a*, 14*b*, and 14*c*) that partition the internal space of the first light blocking wall 12 into a plurality of spaces.

The first and second light blocking walls 12 and 14 are provided concentrically, and front end portions of the first and second light blocking walls 12 and 14 are connected to each other by a cross-shaped support portion 30*a* and rear end portions of the first and second light blocking walls 12 and 14 are connected to each other by a cross-shaped support portion 30*b*. Further, as shown in FIG. 3, a mounting portion 12*a*, which is used to mount the lens hood 10 on a lens barrel for a telephoto lens, is formed at the rear end portion of the first light blocking wall 12.

Since the internal space of the first light blocking wall 12 having the cylindrical outermost periphery is partitioned into a plurality of spaces by the second light blocking walls 14, the aspect ratio of the longitudinal section of each space partitioned as shown in FIG. 3 can be reduced. Accordingly, it is possible to block oblique light (unnecessary light) that is incident at a large angle exceeding an imaging angle of view, and to make the lengths of the first and second light blocking walls 12 and 14 shorter than the length of an ordinary lens hood that is not provided with the second light blocking walls 14.

Further, the first and second light blocking walls 12 and 14 are not parallel to an optical axis, and are provided in parallel (also including the case of substantially parallel) to the traveling direction of effective light beams (first effective light beams) used to form a subject image within the angle of view of a telephoto lens. Each light blocking wall is formed in the shape of a trumpet of which the diameters of front and rear end portions are different from each other.

The second light blocking wall 14*c*, which is provided at the central portion of the lens hood 10 as shown in FIG. 3, allows effective light beams, which correspond to the space partitioned by the second light blocking wall 14*c*, of all effective light beams to pass therethrough and blocks oblique light that is incident at an angle exceeding the angle of view of the effective light beams. However, the second light blocking wall 14*c* is formed substantially in parallel to the traveling direction of the effective light beams that are allowed to pass (the traveling direction of central light beams of the effective light beams that are allowed to pass). In the case of this embodiment, the central light beams of the effective light beams, which are allowed to pass through the second light blocking walls 14*c*, correspond to an optical axis L of a telephoto lens in a case in which the lens hood 10 is mounted on the telephoto lens and the second light blocking wall 14*c* is substantially parallel to the optical axis L of the telephoto lens.

On the other hand, effective light beams, which pass through the space (the peripheral space of the lens hood 10) partitioned by the first light blocking wall 12 and the second light blocking wall 14*a*, include effective light beams, which correspond to an end of an imaging angle of view, of all effective light beams, and the first and second light blocking walls 12 and 14*a* are formed substantially in parallel to the traveling direction of the effective light beams. The first and second light blocking walls 12 and 14*a* are inclined with respect to the direction of the optical axis L without being parallel to the optical axis L as shown in FIG. 3.

Likewise, the second light blocking walls 14*b* is formed so as to have an intermediate inclination between the inclination of the second light blocking wall 14*a* and the inclination of the second light blocking walls 14*c*.

Figure 4A:
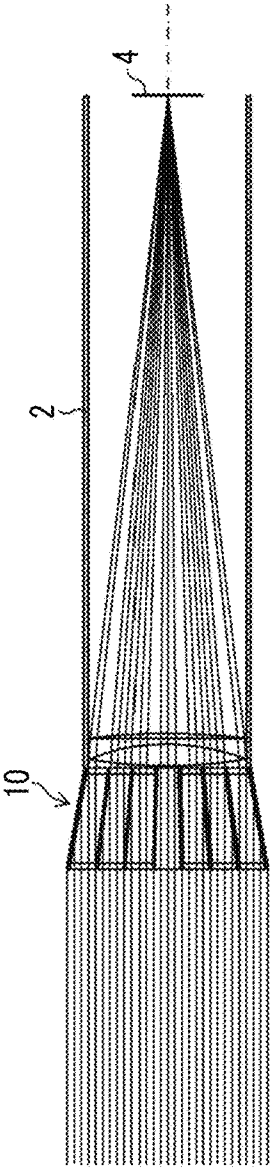
FIGS. 4A, 4B, and 4C are diagrams schematically showing the action of the lens hood that is mounted on a telephoto lens.
Figure 4B:
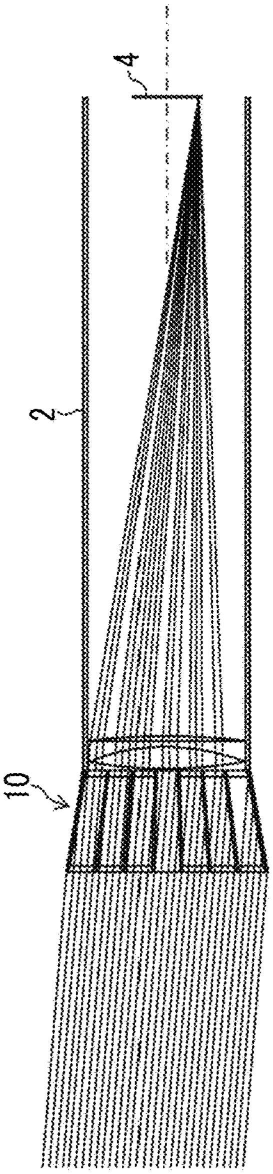
Figure 4C:
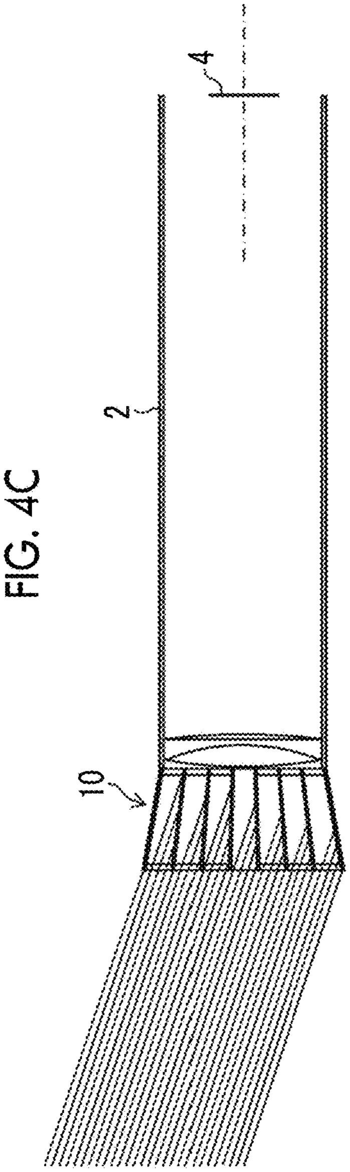

FIGS. 4A, 4B, and 4C are diagrams schematically showing the action of the lens hood 10 that is mounted on the telephoto lens 2.

FIG. 4A shows an aspect in which effective light beams substantially parallel to the optical axis L are incident on the telephoto lens 2 through the lens hood 10, and FIG. 4B shows an aspect in which effective light beams corresponding to an end of an imaging angle of view are incident on the telephoto lens 2 through the lens hood 10.

FIG. 4C shows an aspect in which unnecessary light exceeding the end of the imaging angle of view is blocked by the lens hood 10. As shown in FIG. 4C, unnecessary light exceeding the end of the imaging angle of view is blocked by the first and second light blocking walls 12 and 14.

Since the first and second light blocking walls 12 and 14 are provided in parallel to the traveling direction of the first effective light beams used to form a subject image within the angle of view of the telephoto lens 2, it is possible to minimize the blocking of the first effective light beams while reliably blocking unnecessary light.

Further, antireflection treatment is performed on the wall surface of each of the first and second light blocking walls 12 and 14. Accordingly, the first and second light blocking walls 12 and 14 prevent the reflection of light blocked by the wall surfaces, and remove and absorb stray light and scattered light. For example, mat black coating, coating using an antireflection film, and the like considered as the antireflection treatment.

Second, Third, and Fourth Embodiments of Lens Hood

Figure 5:
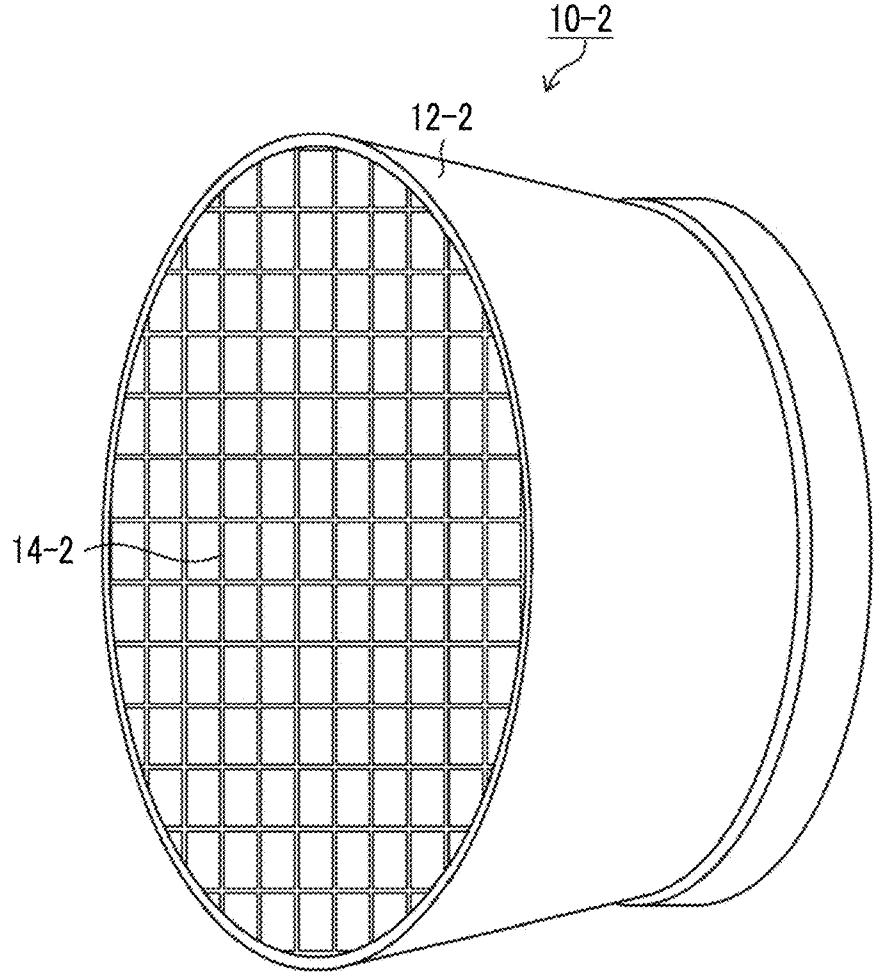
FIG. 5 is a perspective view showing a second embodiment of the lens hood according to the invention.
Figure 6:
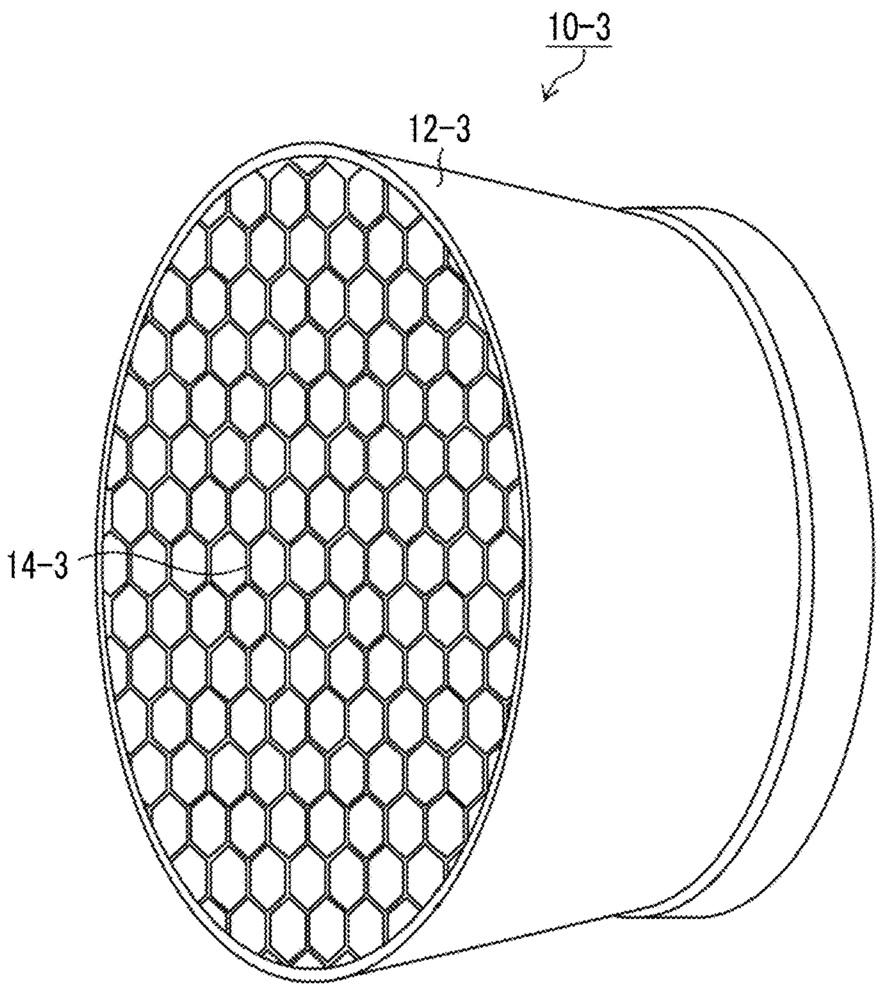
FIG. 6 is a perspective view showing a third embodiment of the lens hood according to the invention.
Figure 7:
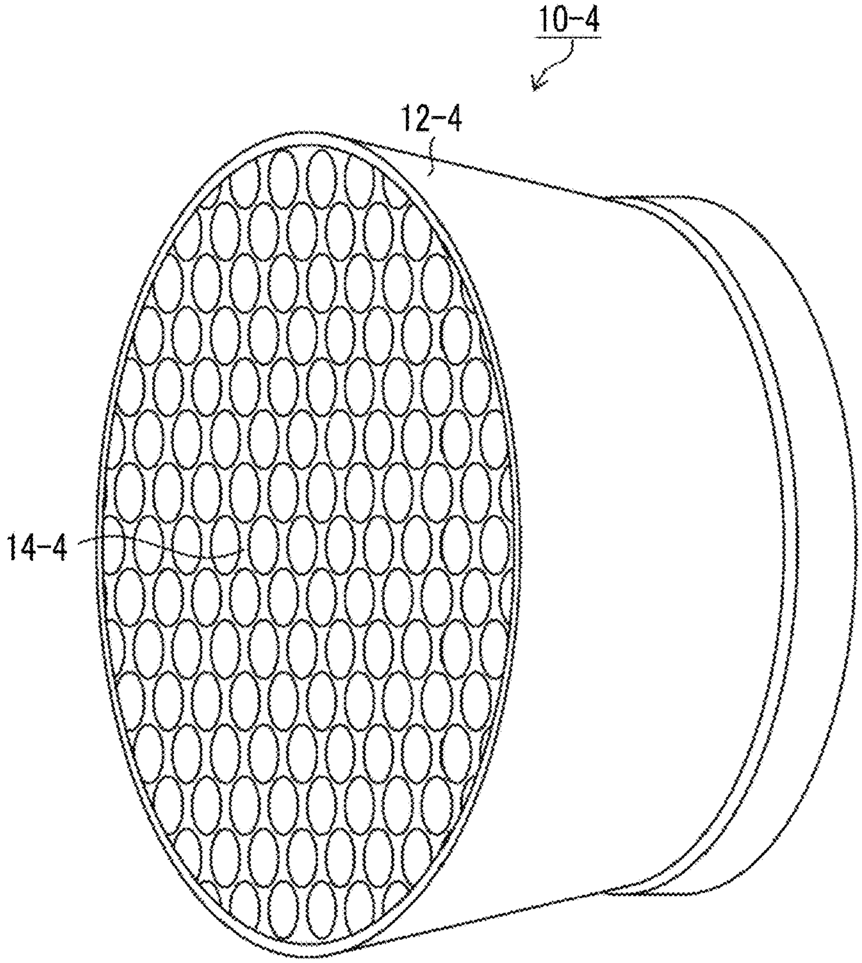
FIG. 7 is a perspective view showing a fourth embodiment of the lens hood according to the invention.

FIGS. 5, 6, and 7 are perspective views showing second, third, and fourth embodiments of the lens hood according to the invention, respectively.

A lens hood 10-2 of a second embodiment shown in FIG. 5 includes a first light blocking wall 12-2 that forms the cylindrical outermost periphery and a grid-shaped second light blocking wall 14-2 (in this embodiment, a square grid-shaped second light blocking wall) that partitions the internal space of the first light blocking wall 12-2 into a plurality of spaces.

The first and second light blocking walls 12-2 and 14-2 are not parallel to an optical axis, and are provided in parallel to the traveling direction of effective light beams used to form a subject image within the angle of view of a telephoto lens.

A lens hood 10-3 of a third embodiment shown in FIG. 6 includes a first light blocking wall 12-3 that forms the cylindrical outermost periphery and honeycomb-shaped second light blocking walls 14-3 that partition the internal space of the first light blocking wall 12-3 into a plurality of spaces.

The first and second light blocking walls 12-3 and 14-3 are not parallel to an optical axis, and are provided in parallel to the traveling direction of effective light beams used to form a subject image within the angle of view of a telephoto lens.

A lens hood 10-4 of a fourth embodiment shown in FIG. 7 includes a first light blocking wall 12-4 that forms the cylindrical outermost periphery and cylindrical second light blocking walls 14-4 that partition the internal space of the first light blocking wall 12-4 into a plurality of spaces.

The first and second light blocking walls 12-4 and 14-4 are not parallel to an optical axis, and are provided in parallel to the traveling direction of effective light beams used to form a subject image within the angle of view of a telephoto lens. Each light blocking wall is formed in the shape of a trumpet of which the diameters of front and rear end portions are different from each other.

The lens hoods 10-2 to 10-4 of the second to fourth embodiments are different from the lens hood 10 of the first embodiment in terms of the shape of the lens hood (particularly, the shape of the second light blocking wall), but have the same function as the function of the lens hood 10 of the first embodiment.

Fifth Embodiment of Lens Hood

Figure 8:
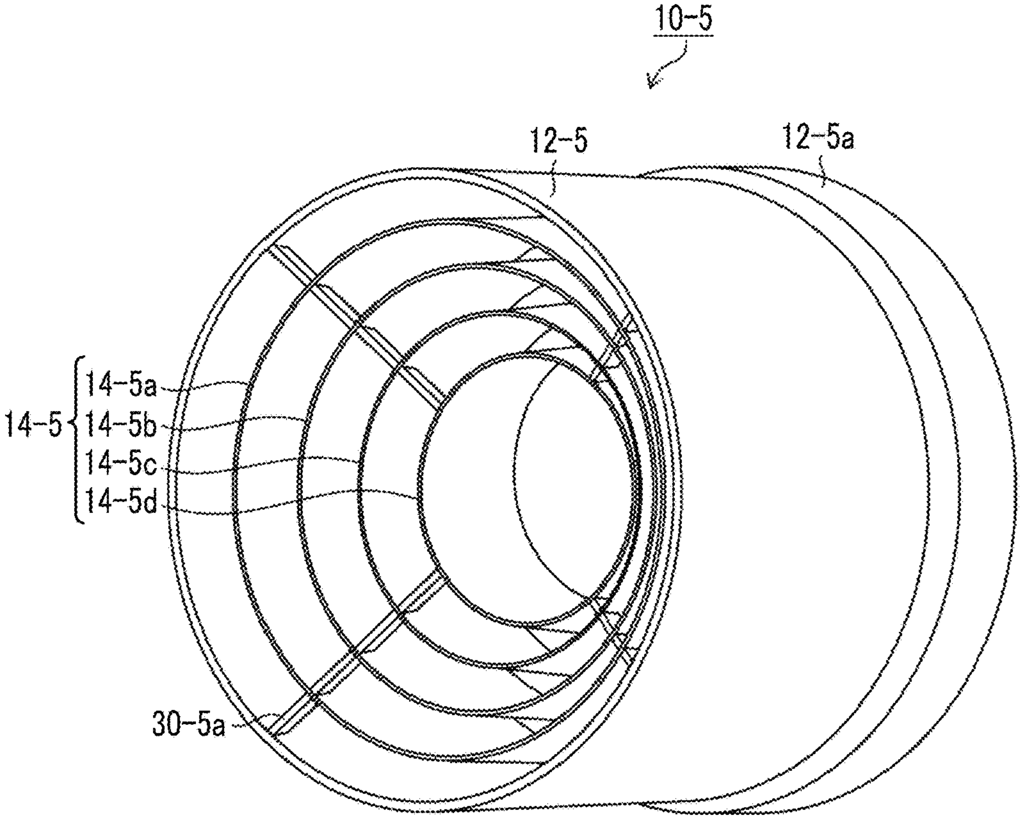
FIG. 8 is a perspective view showing a fifth embodiment of the lens hood according to the invention.
Figure 9:
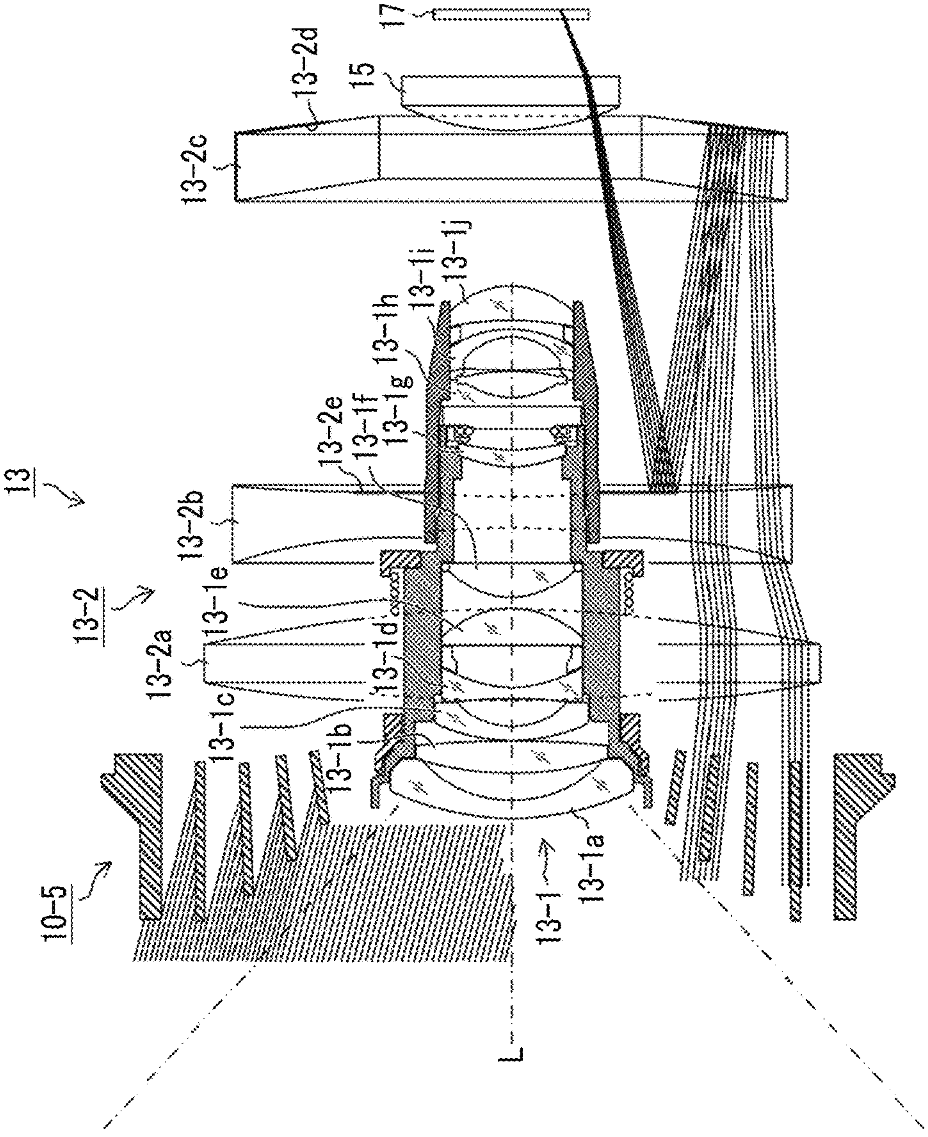
FIG. 9 is a sectional view of an imaging section that includes the lens hood of the fifth embodiment and a reflective telephoto lens to which the lens hood is applied.

FIG. 8 is a perspective view showing a fifth embodiment of the lens hood according to the invention, and FIG. 9 is a sectional view of an imaging section that includes the lens hood of the fifth embodiment and a reflective telephoto lens to which the lens hood is applied.

As shown in FIG. 8, a lens hood 10-5 of the fifth embodiment is a lens hood that is mounted on a reflective telephoto lens (in an embodiment shown in FIG. 9, a multifocal lens 13 including a reflective telephoto lens 13-2), and manly includes a first light blocking wall 12-5 that forms the cylindrical outermost periphery and cylindrical second light blocking walls 14-5 (in this embodiment, four second light blocking walls **14-5*a*, 14-5*b*, 14-5*c*, and 14-5*d*) that partition an annular internal space, which is the internal space of the first light blocking wall 12-5 and corresponds to the reflective telephoto lens 13-2**, into a plurality of spaces.

The first light blocking wall 12-5 and the second light blocking walls 14-5 are provided concentrically, and front end portions of the first and second light blocking walls are connected to each other by a cross-shaped support portion **30-5*a* and rear end portions of the first and second light blocking walls are connected to each other by a cross-shaped support portion 30-5*b*. Further, a mounting portion 12-5*a*, which is used to mount the lens hood 10-5 on a lens barrel for a reflective telephoto lens (a multifocal lens 13 shown in FIG. 9), is formed at the rear end portion of the first light blocking wall 12-5**.

[Multifocal Lens]

Next, the multifocal lens 13 including the reflective telephoto lens 13-2 will be described.

As shown in FIG. 9, the multifocal lens 13 includes a wide-angle lens 13-1 that is provided at a central portion and an annular telephoto lens (reflective telephoto lens) 13-2 that is provided at a peripheral portion of the wide-angle lens. The wide-angle lens 13-1 and the telephoto lens 13-2 are disposed on the same optical axis.

The wide-angle lens 13-1 is a wide-angle lens that includes first to tenth lenses **13-1*a* to 13-1*j* and a common lens 15; and forms a wide-angle image on a directional sensor 17**.

The reflective telephoto lens 13-2 is a telephoto lens that includes a first lens **13-2*a*, a second lens 13-2*b*, a third lens 13-2*c*, a first reflecting mirror 13-2*d* and a second reflecting mirror 13-2*e* as a reflective optical system, and the common lens 15; and forms a telescopic image on the directional sensor 17**.

Light flux, which is incident through the first lens **13-2*a*, the second lens 13-2*b*, and the third lens 13-2*c* of the reflective telephoto lens 13-2, passes through the common lens 15 after being reflected twice by the first reflecting mirror 13-2*d* and the second reflecting mirror 13-2*e*. Since light flux is turned back by the first reflecting mirror 13-2*d* and the second reflecting mirror 13-2*e***, the length of the telephoto lens, which has a long focal length, in the direction of the optical axis is reduced.

The lens hood 10-5 of the fifth embodiment, which is applied to the multifocal lens 13 including the reflective telephoto lens 13-2 having the above-mentioned structure, is adapted so that the internal space of the first light blocking wall 12-5 forming the cylindrical outermost periphery is partitioned into a plurality of spaces by the second light blocking walls 14-5. Accordingly, as in the lens hood 10 of the first embodiment, the lens hood 10-5 of the fifth embodiment can block oblique light (unnecessary light) that is incident at a large angle exceeding the imaging angle of view and the length of the first light blocking wall 12-5 and the length of each of the second light blocking walls 14-5 can be made to be shorter than the lengths of those of an ordinary lens hood that is not provided with the second light blocking walls 14-5.

Further, the first light blocking wall 12-5 and the second light blocking walls 14-5 are not parallel to the optical axis, and are provided in parallel to the traveling direction of effective light beams (the first effective light beams) used to form a subject image within the angle of view of the reflective telephoto lens 13-2. Each light blocking wall is formed in the shape of a trumpet of which the diameters of front and rear end portions are different from each other. The lens hood 10-5 of the fifth embodiment is different from the lens hood 10 of the first embodiment in that the diameter of the front end portion is larger than the diameter of the rear end portion.

Figure 10:
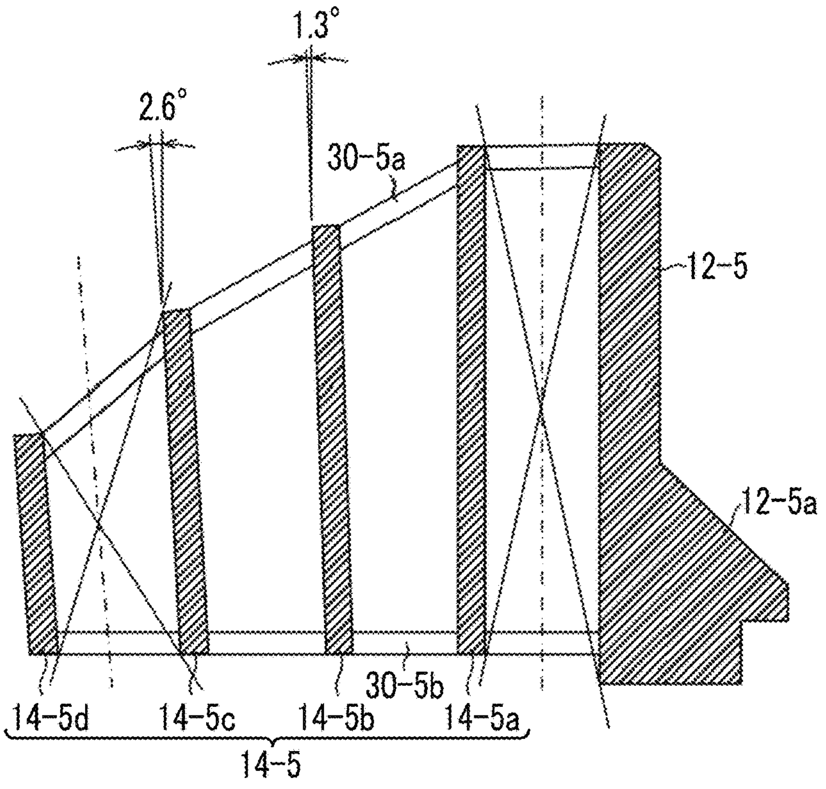
FIG. 10 is a sectional view of main parts of the lens hood of the fifth embodiment.

FIG. 10 is a sectional view of main parts of the lens hood 10-5 of the fifth embodiment.

Effective light beams, which pass through the space (the peripheral space of the lens hood 10-5) partitioned by the first light blocking wall 12-5 and the second light blocking wall 14-5*a* of the lens hood 10-5 as shown in FIGS. 9 and 10, form an image on the central portion of the image-forming surface of the directional sensor 17 due to the nature of the reflective telephoto lens 13-2. Accordingly, the traveling direction of the effective light beams, which pass through the peripheral space of the lens hood 10-5, among all the effective light beams of the reflective telephoto lens 13-2 is parallel to the optical axis L, and the first and second light blocking walls 12-5 and 14-5*a*, which are formed in parallel to the traveling direction of the effective light beams, are parallel to the optical axis L.

on the other hand, the effective light beams, which pass through the space partitioned by the second light blocking walls 14-5*c* and 14-5*d* (the central space of the lens hood 10-5), form an image on the peripheral portion of the image-forming surface of the directional sensor 17 due to the nature of the reflective telephoto lens 13-2. Accordingly, since the effective light beams, which pass through the central space of the lens hood 10-5, among all the effective light beams of the reflective telephoto lens 13-2 include effective light beams corresponding to an end of an imaging angle of view of the reflective telephoto lens 13-2, the second light blocking walls 14-5*c* and 14-5*d* are formed substantially in parallel to the traveling direction of the effective light beams. That is, the second light blocking walls 14-5*c* and 14-5*d* are not parallel to the optical axis L, and are inclined with respect to the direction of the optical axis L. Particularly, the light blocking walls are inclined with respect to the direction of the optical axis L so that the diameter of the rear end portion of each light blocking wall is larger than the diameter of the front end portion of each light blocking wall.

Likewise, the second light blocking wall 14-5*b* is formed so as to have an intermediate inclination between the inclination of the second light blocking wall 14-5*a* and the inclination of the second light blocking wall 14-5*c*.

The second light blocking walls 14-5*a* and 14-5*d* are inclined so as to approach the optical axis L of the reflective telephoto lens 13-2 in parallel to the optical axis L with an increase in a distance between each second light blocking wall and the center of the optical axis of the reflective telephoto lens 13-2 in this way.

Further, as shown in FIG. 10, intervals between the front end portions of the respective light blocking walls of the first and second light blocking walls 12-5 and 14-5 of the lens hood 10-5 are increased toward the center of the lens hood 10-5 and intervals between the rear end portions of the respective light blocking walls are substantially equal to each other.

Furthermore, as shown in FIG. 10, the heights (the length in the direction of the optical axis) of the respective light blocking walls of the first and second light blocking walls 12-5 and 14-5 of the lens hood 10-5 vary in accordance with distances between the light blocking walls and the center of the optical axis of the multifocal lens 13, and the heights of the second light blocking walls 14-5*b*, 14-5*c*, and 14-5*d* are adapted to be gradually reduced from the heights of the first and second light blocking walls 12-5 and 14-5*a*.

According to the lens hood 10-5 having the above-mentioned structure, the first effective light beams, which are used to form a subject image within the angle of view of the reflective telephoto lens 13-2, can be made to pass as much as possible and unnecessary light (first unnecessary light) other than the first effective light beams can be reliably blocked. Further, as shown in FIG. 9, effective light beams (second effective light beams), which are used to form a subject image within the angle of view of the wide-angle lens 13-1 of the multifocal lens 13, can be made to pass (effective light beams can be made not to be blocked by the lens hood 10-5) and unnecessary light (second unnecessary light) other than the second effective light beams can be reliably blocked.

It goes without saying that the lens hood 10-5 of the fifth embodiment is not limited to the multifocal lens 13 including the reflective telephoto lens 13-2 shown in FIG. 9 and can also be applied to a single reflective telephoto lens.

[Imaging Device]

Figure 11:
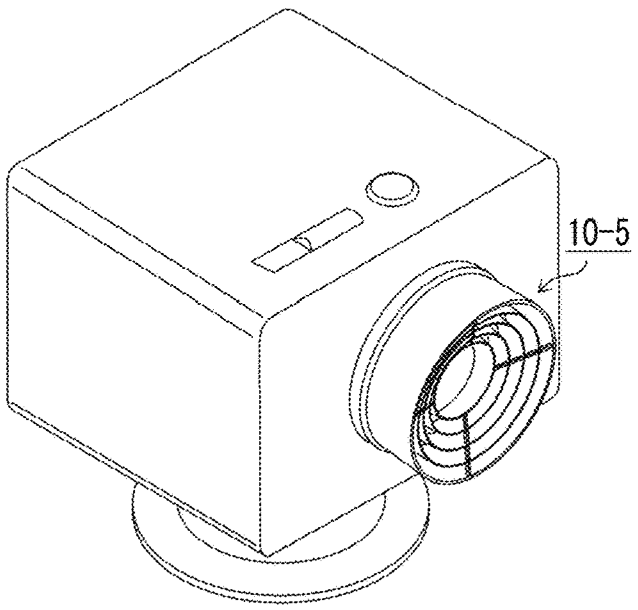
FIG. 11 is a perspective view of the appearance of an imaging device according to the invention.

FIG. 11 is a perspective view of the appearance of an imaging device according to the invention.

The imaging device shown in FIG. 11 includes the multifocal lens 13 and the directional sensor 17 shown in FIG. 9, and the lens hood 10-5 of the fifth embodiment shown in FIG. 8 and the like is detachably or undetachably is fixed to a lens barrel for the multifocal lens 13.

<Directional Sensor>

Figure 12:
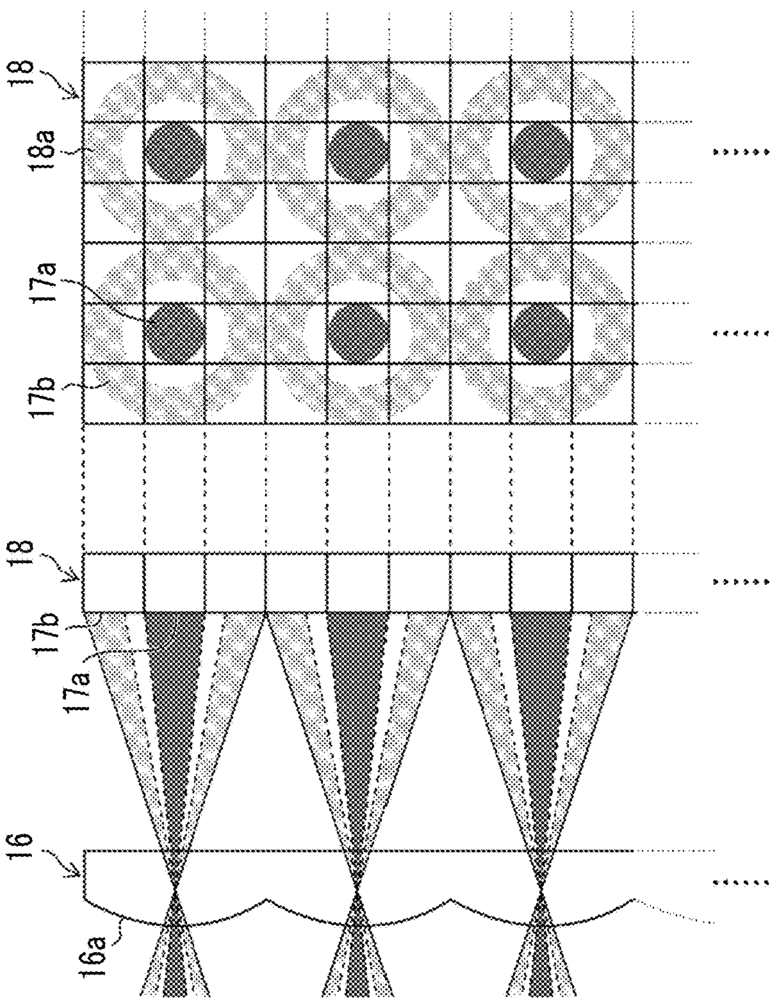
FIG. 12 is an enlarged view of main parts of a microlens array and an image sensor of a directional sensor.

FIG. 12 is an enlarged view of main parts of the directional sensor 17. As shown in FIG. 12, the directional sensor 17 applied to the multifocal lens 13 shown in FIG. 9 includes a microlens array 16, which corresponds to a pupil-split part, and an image sensor 18.

The microlens array 16 has a structure in which a plurality of microlenses (pupil imaging lenses) 16*a* are two-dimensionally arrayed, and the lengths of each microlens in the horizontal direction and the vertical direction correspond to the length of three light receiving cells 18*a* each of which is a photoelectric conversion element of the image sensor 18. That is, a microlens, which is formed so as to correspond to the position of the second light receiving cell in each of the horizontal direction and the vertical direction, is used as each microlens of the microlens array 16.

Further, each microlens 16*a* of the microlens array 16 forms a circular central pupil image (first pupil image) 17*a* and an annular pupil image (second pupil image) 17*b*, which correspond to the wide-angle lens 13-1 and the reflective telephoto lens 13-2 of the multifocal lens 13, on the light receiving cells 18*a* of a corresponding light receiving region of the image sensor 18.

According to the microlens array 16 and the image sensor 18 shown in FIG. 12, grid-shaped (square grid-shaped) 3×3 light receiving cells 18*a* are allocated to each microlens 16*a* of the microlens array 16.

<Internal Configuration of Imaging Device>

Figure 13:
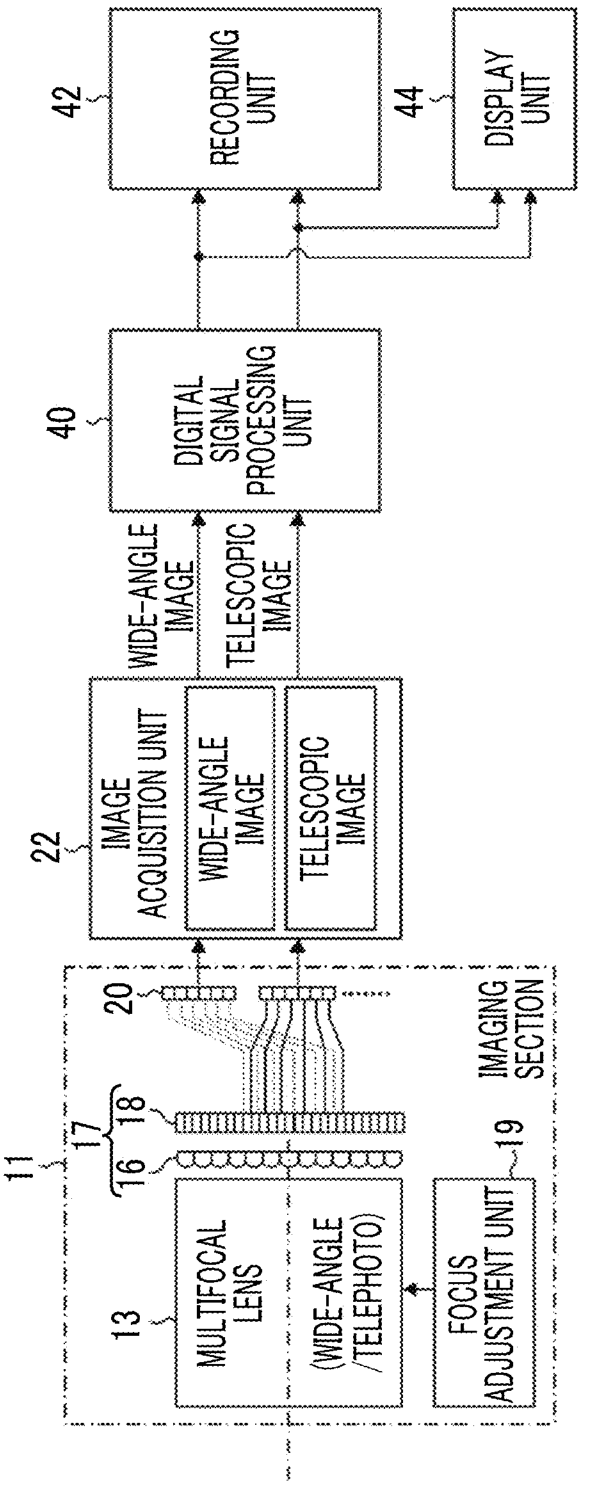
FIG. 13 is a block diagram showing an embodiment of the internal configuration of the imaging device.

FIG. 13 is a block diagram showing an embodiment of the internal configuration of the imaging device shown in FIG. 12.

As shown in FIG. 13, the imaging device includes an imaging section 11 that includes the multifocal lens 13 including the wide-angle lens 13-1 and the reflective telephoto lens 13-2 described in FIG. 9 and the directional sensor 17 including the microlens array 16 and the image sensor 18 described in FIG. 12.

It is preferable that the imaging section 11 includes a focus adjustment unit 19 adjusting the focus of the reflective telephoto lens 13-2. A focus adjustment unit may be separately provided for the wide-angle lens 13-1, and pan focus may be applied.

The imaging section 11 can simultaneously pick up a wide-angle image and a telescopic image through the multifocal lens 13 and the directional sensor 17, and a subject image, which is formed on the light receiving surface of each light receiving cell (photoelectric conversion element) of the directional sensor 17 (the image sensor 18) through the multifocal lens 13, is converted into a signal voltage (or electric charge) corresponding to the amount of incident light thereof.

Signal voltages (or electric charges), which are accumulated in the image sensor 18, are stored in the light receiving cells themselves or an installed capacitor. The stored signal voltages (or electric charges) are read together with the selection of the positions of the light receiving cells by using a method of a metal oxide semiconductor (MOS) imaging element using an X-Y address system (so-called complementary metal oxide semiconductor (CMOS) sensor).

Accordingly, pixel signals, which represent a wide-angle image of a group of central light receiving cells corresponding to the wide-angle lens 13-1, and pixel signals, which represent a telescopic image of a group of eight peripheral light receiving cells corresponding to the reflective telephoto lens 13-2, can be read from the image sensor 18.

After a pixel signal of each light receiving cell is sampled and held by sampling two correlation pile processing (processing for obtaining accurate pixel data by taking a difference between a feedthrough component level and a signal component level included an output signal of each light receiving cell in order to reduce noises (particularly, thermal noises) included in a sensor out signal) and is amplified, pixel signals (voltage signals) read from the image sensor 18 are added to an analog-to-digital (A/D) converter 20. The A/D converter 20 converts the pixel signals, which are sequentially input, into digital signals and outputs the digital signals to an image acquisition unit 22. There is a MOS sensor in which an A/D converter is built. In this case, digital signal are directly output from the image sensor 18.

The image acquisition unit 22 can simultaneously or selectively acquire pixel signals, which represent a wide-angle image, and pixel signals, which represent a telescopic image, by selecting the positions of the light receiving cells of the image sensor 18 and reading pixel signals.

That is, the image acquisition unit 22 can acquire pixel signals representing a wide-angle image of one light receiving cell (the central light receiving cell of the 3×3 light receiving cells) per microlens by selectively reading pixel signals of the light receiving cell on which the central pupil image 17*a* of the image sensor 18 is incident. On the other hand, the image acquisition unit 22 can acquire pixel signals representing a telescopic image of eight light receiving cells (the peripheral light receiving cells of the 3×3 light receiving cells) per microlens by selectively reading pixel signals of the light receiving cells on which the annular pupil image 17*b* of the image sensor 18 is incident.

The image acquisition unit 22 may read all pixel signals from the image sensor 18, temporarily store the pixel signals in a buffer memory, and group of pixel signals of two images of a wide-angle image and a telescopic image from the pixel signals stored in the buffer memory.

The pixel signals, which represent the wide-angle image and the telescopic image acquired by the image acquisition unit 22, are output to a digital signal processing unit 40.

The digital signal processing unit 40 performs predetermined signal processing, such as offset processing or gamma-correction processing, on the digital pixel signals to be input.

Image signals, which are processed by the digital signal processing unit 40 and represent the wide-angle image and the telescopic image, are output to a recording unit 42 and a display unit 44. The recording unit 42 records the image signals for video recording or still image recording, which are processed by the digital signal processing unit 40 and represent the wide-angle image and the telescopic image, on a recording medium (a hard disk, a memory card, or the like).

The display unit 44 displays the wide-angle image and the telescopic image by the image signals for video display or still image display that are processed by the digital signal processing unit 40 and represent the wide-angle image and the telescopic image. The display unit 44 can also play back the wide-angle image and the telescopic image on the basis of the image signals that are recorded in the recording unit 42.

Another Embodiment of Directional Sensor

Figure 14:
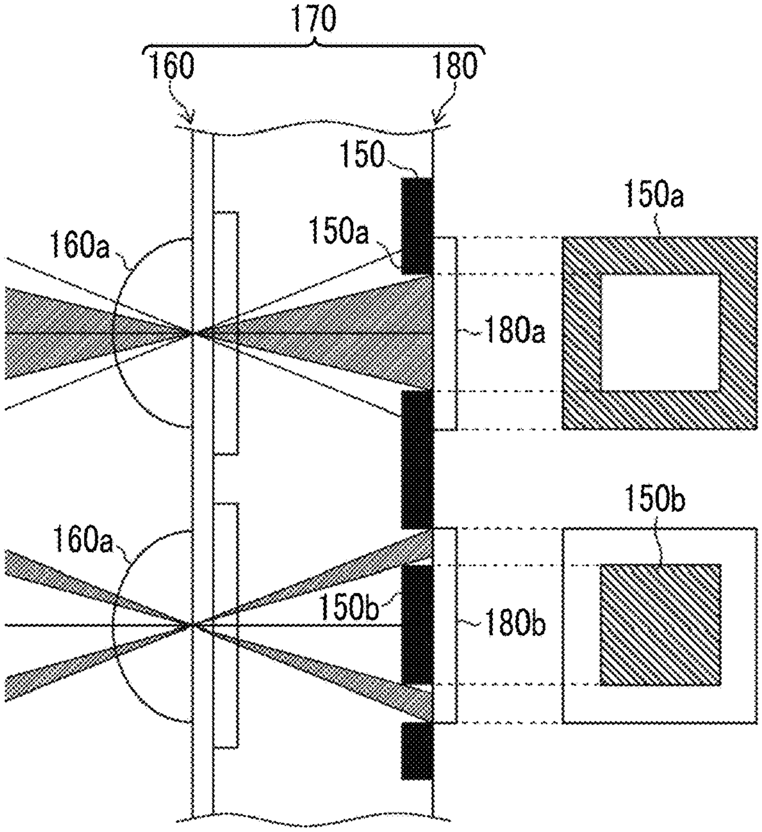
FIG. 14 is a side view showing another embodiment of the directional sensor.

FIG. 14 is a side view showing another embodiment of the directional sensor.

This directional sensor 170 includes a microlens array 160 that corresponds to a pupil-split part, a light blocking member 150 that functions as a light blocking mask, and an image sensor 180 of which a part of light receiving cells 180*a* and 180*b* are masked by the light blocking member 150. The light receiving cells 180*a* and 180*b* of which a part are masked by the light blocking member 150 are provided alternately (in the shape of a checkered flag) in a lateral direction and a vertical direction of the image sensor 180.

The microlens array 160 includes microlenses 160*a* that correspond to the light receiving cells 180*a* and 180*b* of the image sensor 180 one to one.

The light blocking member 150 is to regulate the openings of the light receiving cells 180*a* and 180*b* of the image sensor 180, and has the shape of openings corresponding to a wide-angle lens 13-1 and a reflective telephoto lens 13-2 of the multifocal lens 13 shown in FIG. 9.

The peripheral portions of the openings of the light receiving cells 180*a* are masked by light blocking portions 150*a* of the light blocking member 150. On the other hand, the central portions of the openings of the light receiving cells 180*b* are masked by light blocking portions 150*b* of the light blocking member 150. Accordingly, light flux, which passes through the wide-angle lens 13-1 of the multifocal lens 13, is pupil-split by the microlens array 160 and the light blocking portions 150*a* of the light blocking member 150 and is incident on the light receiving cells 180*a*, and light flux, which passes through the reflective telephoto lens 13-2 of the multifocal lens 13, is pupil-split by the microlens array 160 and the light blocking portions 150*b* of the light blocking member 150 and is incident on the light receiving cells 180*b*.

Accordingly, the pixel signals of the wide-angle image can be read from each light receiving cell 180*a* of the image sensor 180, and the pixel signals of the telescopic image can be read from each light receiving cell 180*b* of the image sensor 180.

Examples of another embodiment of the imaging device include a mobile phone or a smartphone, a personal digital assistant (PDA), and a portable game machine having a camera function. A smartphone will be described in detail below with reference to the drawings by way of example.

<Configuration of Smartphone>

Figure 15:
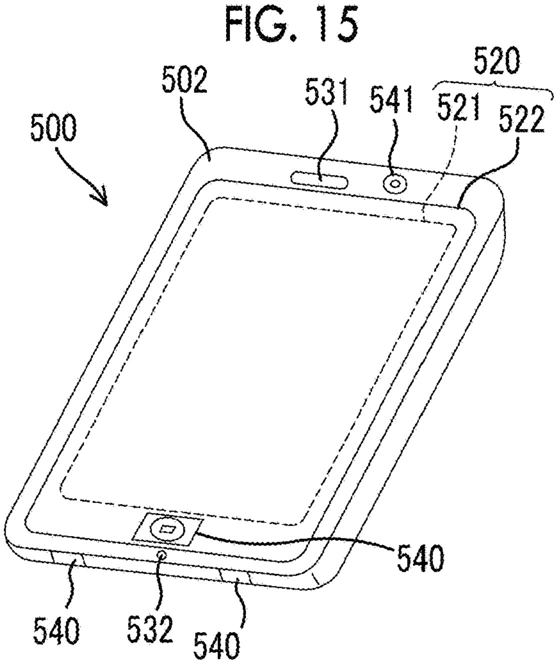
FIG. 15 is a view showing the appearance of a smartphone that is another embodiment of the imaging device.

FIG. 15 is a view showing the appearance of a smartphone 500 that is another embodiment of the imaging device. The smartphone 500 shown in FIG. 15 includes a flat plate-like housing 502, and a display input unit 520 in which a display panel 521 as a display unit and an operation panel 522 as an input unit are integrated with each other on one surface of the housing 502. Further, the housing 502 includes a speaker 531, a microphone 532, an operation unit 540, and a camera unit 541. The configuration of the housing 502 is not limited thereto. For example, a configuration in which a display unit and an input unit are independent of each other can be employed, and a configuration including a folding structure or a slide mechanism can also be employed.

Figure 16:
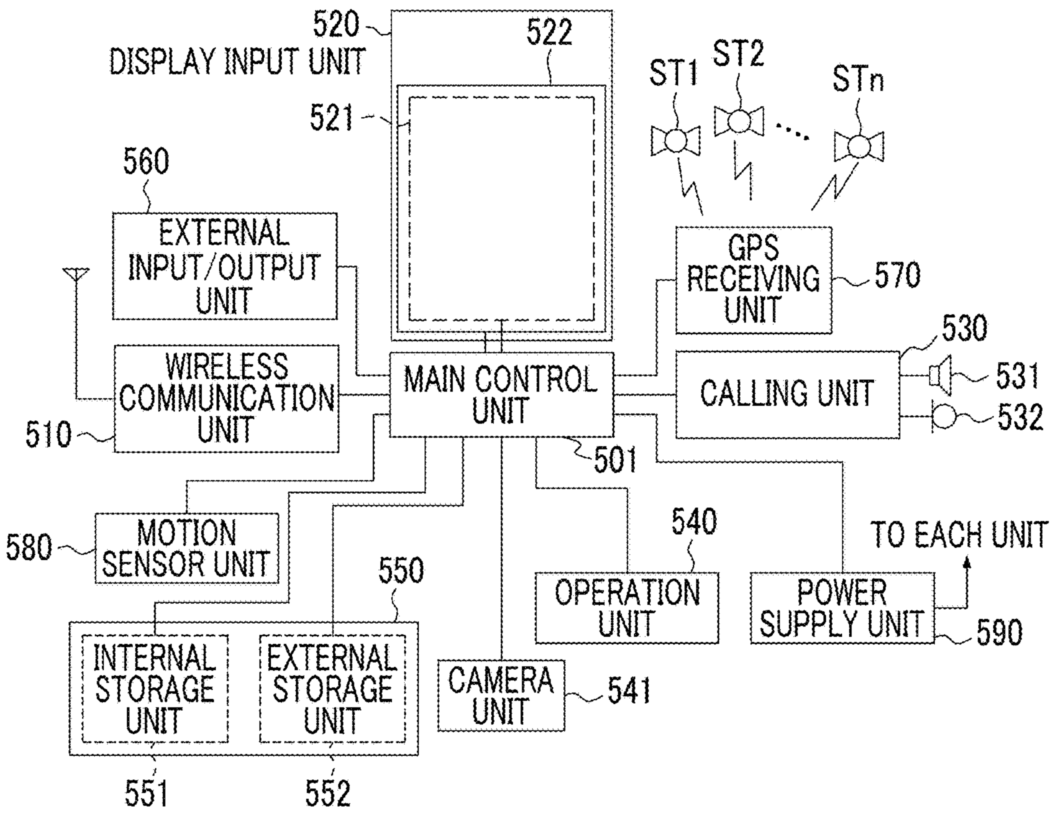
FIG. 16 is a block diagram showing the configuration of main parts of the smartphone.
Figure 17A:
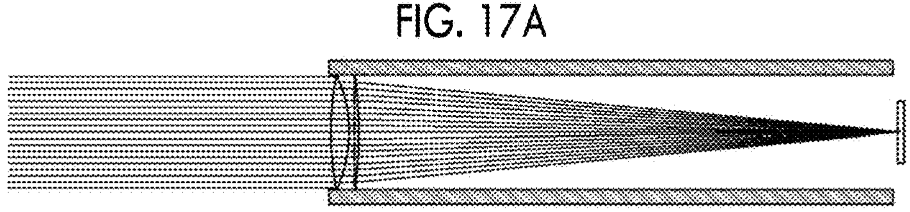
FIGS. 17A, 17B, 17C, and 17D are diagrams schematically showing the related art.
Figure 17B:
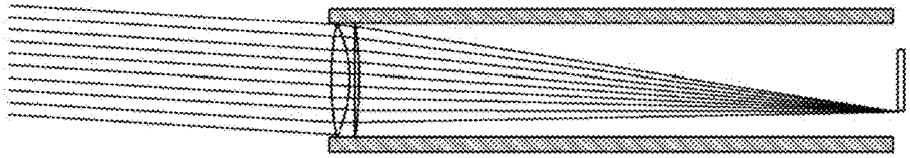
Figure 17C:
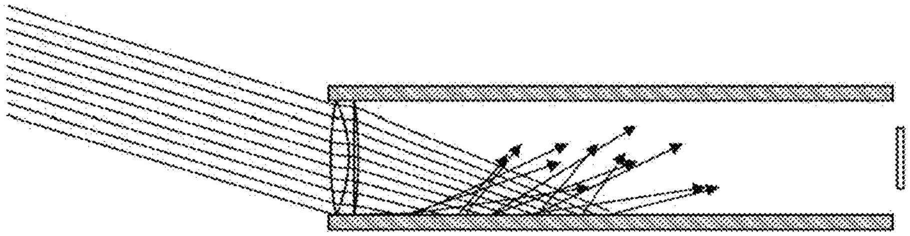
Figure 17D:
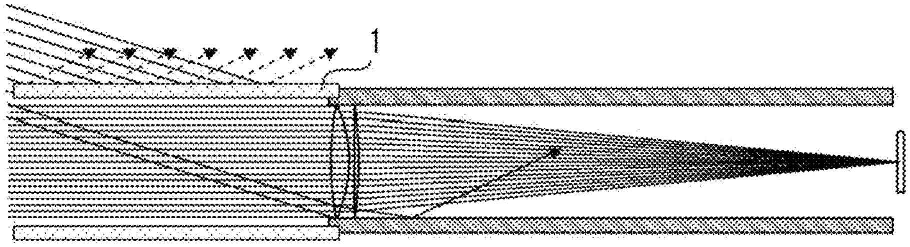

FIG. 16 is a block diagram showing the configuration of the smartphone 500 shown in FIG. 15. As shown in FIG. 16, the smartphone 500 includes a wireless communication unit 510, a display input unit 520, a calling unit 530, an operation unit 540, a camera unit 541, a storage unit 550, an external input/output unit 560, a global positioning system (GPS) receiving unit 570, a motion sensor unit 580, a power supply unit 590, and a main control unit 501, as main components of the smartphone 500. Further, the smartphone 500 has a wireless communication function to perform mobile radio communication through a base station device BS and a mobile radio communication network NW, as main functions of the smartphone 500.

The wireless communication unit 510 performs wireless communication with the base station device BS, which is set in the mobile radio communication network NW, according to an instruction of the main control unit 501. The wireless communication unit 510 transmits and receives various file data, such as voice data and image data, Email data, and the like and receives Web data, streaming data, and the like by using this wireless communication.

The display input unit 520 is a so-called touch panel that displays images (still images and videos), message information, and the like by the control of the main control unit 501 to visually convey information to a user and detects a user's operation with respect to the displayed information. The display input unit 520 includes a display panel 521 and an operation panel 522. It is preferable that the display panel 521 is a 3D display panel in a case in which a user appreciates generated 3D images.

The display panel 521 uses a liquid crystal display (LCD), an organic electro-luminescence display (OELD), or the like as a display device.

The operation panel 522 is a device that is placed so as to allow an image, which is displayed on the display surface of the display panel 521, to be visible and detects one or a plurality of coordinates operated by a user's finger or a stylus. When the operation panel 522 is operated by a user's finger or a stylus, the operation panel 522 outputs detection signals, which are generated due to the operation, to the main control unit 501. Next, the main control unit 501 detects operation positions (coordinates) on the display panel 521 on the basis of the received detection signals.

As shown in FIG. 15, the display panel 521 and the operation panel 522 of the smartphone 500 are integrated with each other and form the display input unit 520. However, the operation panel 522 is disposed so as to completely cover the display panel 521. In a case in which this disposition is employed, the operation panel 522 may also have a function to detect the user's operation in a region outside the display panel 521. In other words, the operation panel 522 may include a detection region (hereinafter, referred to as a display region) relating to an overlapping portion that overlaps the display panel 521 and a detection region (hereinafter, referred to as a non-display region) relating to the other outer peripheral portion that does not overlap the display panel 521.

The size of the display region and the size of the display panel 521 may completely correspond to each other, but do not necessarily need to correspond to each other. Further, the operation panel 522 may include two sensitive regions, that is, an outer peripheral portion and an inner portion other than the outer peripheral portion. Furthermore, the width of the outer peripheral portion is appropriately designed in accordance with the size of the housing 502, or the like. Moreover, examples of a position detection system, which is employed in the operation panel 522, include a matrix switch system, a resistive film system, a surface acoustic wave system, an infrared system, an electromagnetic induction system, and a capacitance system, and any system thereof can also be employed.

The calling unit 530 includes the speaker 531 and the microphone 532. The calling unit 530 converts the voice of a user, which is input through the microphone 532, into voice data, which can be processed by the main control unit 501, and outputs the voice data to the main control unit 501, or decodes the voice data, which is received by the wireless communication unit 510 or the external input/output unit 560, and outputs the voice from the speaker 531. Further, as shown in FIG. 15, for example, the speaker 531 and the microphone 532 can be mounted on the same surface as the surface on which the display input unit 520 is provided.

The operation unit 540 is a hardware key using a key switch or the like, and receives an instruction from a user. For example, the operation unit 540 is mounted below the display unit in the housing 502 of the smartphone 500, that is, on the surface of a portion below the display unit. The operation unit 540 is a push-button switch that is turned on when being pressed by a finger or the like and is turned off by a restoring force of a spring or the like when the finger is separated.

The storage unit 550 stores a control program and control data of the main control unit 501, address data in which the names of communication partners are associated with phone numbers and the like, transmitted and received Email data, Web data downloaded by Web browsing, and downloaded content data; and temporarily stores streaming data and the like. Further, the storage unit 550 includes an internal storage unit 551 that is built in the smartphone and an external storage unit 552 that includes a slot for an attachable and detachable external memory. Each of the internal storage unit 551 and the external storage unit 552 of the storage unit 550 is realized using a storage medium, such as a flash memory type memory, a hard disk type memory, a multimedia card micro type memory, a card type memory (for example, Micro SD (registered trademark) memory or the like), a random access memory (RAM), or a read only memory (ROM).

The external input/output unit 560 serves as an interface with all external devices to be connected to the smartphone 500, and is used to be directly or indirectly connected to other external devices by communication or the like (for example, a universal serial bus (USB), IEEE1394, or the like) or a network (for example, Internet, wireless LAN, Bluetooth (registered trademark), radio frequency identification (RFID), infrared communication (Infrared Data Association: IrDA) (registered trademark), Ultra Wideband (UWB) (registered trademark), ZigBee (registered trademark), or the like).

Examples of the external devices to be connected to the smartphone 500 include: a wired/wireless headset; a wired/wireless external battery charger; a memory card or a subscriber identity module (SIM) card/user identity module (UIM) card, an external audio-video device connected through an audio-video input/output (I/O) terminal; an external audio-video device to be wirelessly connected; a smartphone to be connected wirelessly or by a wire; a personal computer to be connected wirelessly or by a wire; a PDA to be connected wirelessly or by a wire; and earphones to be connected wirelessly or by a wire. The external input/output unit allows data, which is transmitted from such an external device, to be sent to each component provided in the smartphone 500, and allows data, which is stored in the smartphone 500, to be transmitted to the external device.

The GPS receiving unit 570 receives GPS signals, which are sent from GPS satellites ST1 to STn, according to an instruction of the main control unit 501; performs positioning arithmetic processing based on the plurality of received GPS signals; and detects the position of the smartphone 500 that includes a latitude, a longitude, and an altitude. When the GPS receiving unit 570 can acquire position information from the wireless communication unit 510 or the external input/output unit 560 (for example, wireless LAN), the GPS receiving unit 570 can also detect the position of the smartphone by using the position information.

The motion sensor unit 580 includes, for example, a triaxial acceleration sensor or the like, and detects the physical movement of the smartphone 500 according to an instruction of the main control unit 501. The moving direction or acceleration of the smartphone 500 is detected through the detection of the physical movement of the smartphone 500. This detection result is output to the main control unit 501.

The power supply unit 590 supplies power, which is stored in a battery (not shown), to each unit of the smartphone 500 according to an instruction of the main control unit 501.

The main control unit 501 includes a microprocessor, operates according to the control program and control data that are stored in the storage unit 550, and controls the respective units of the smartphone 500 overall. Further, the main control unit 501 has a mobile communication control function, which controls each part of a communication system, and an application processing function, in order to perform voice communication or data communication through the wireless communication unit 510.

The application processing function is realized when the main control unit 501 operates according to application software stored in the storage unit 550. Examples of the application processing function include an infrared communication function that performs data communication with an opposing device by controlling the external input/output unit 560, an Email function that transmits and receives an Email, and a Web browsing function that browses a Web page.

Further, the main control unit 501 has an image processing function to display images on the display input unit 520 on the basis of image data (data of still images or videos), such as received data or downloaded streaming data. The image processing function means a function to display images on the display input unit 520 when the main control unit 501 decodes the image data and performs image processing on the results of the decoding.

Furthermore, the main control unit 501 performs display control for the display panel 521 and operation-detection control for detecting a user's operation performed through the operation unit 540 and the operation panel 522.

The main control unit 501 displays software keys, such as an icon used to start application software and a scroll bar, or displays a window that is used to create an Email, by performing the display control. The scroll bar means a software key that is used to receive an instruction for moving a portion of an image to be displayed when the image is too large to be displayed on the display region of the display panel 521.

Further, the main control unit 501 detects a user's operation performed through the operation unit 540, receives an operation performed on the icon and the input of a character string to an entry field of the window through the operation panel 522, or receives a request for scrolling a displayed image through the scroll bar, by performing the operation-detection control.

Furthermore, the main control unit 501 has a touch panel control function to determine whether the position of an operation performed on the operation panel 522 is present at an overlapping portion (display region) overlapping the display panel 521 or an outer peripheral portion (non-display region) not overlapping the display panel 521 other than the overlapping portion, by performing the operation-detection control, and to control the sensitive regions of the operation panel 522 and the display positions of the software keys.

Further, the main control unit 501 can detect a gesture operation performed on the operation panel 522 and can also perform a preset function according to the detected gesture operation. The gesture operation is not a simple touch operation in the related art; and means an operation for drawing a locus by a finger or the like, an operation for simultaneously specifying a plurality of positions, or an operation for drawing a locus for at least one of the plurality of positions by the combination of these operations.

The camera unit 541 is a digital camera that electronically picks up an image by using an imaging element, such as a complementary metal oxide semiconductor (CMOS) or a charge-coupled device (CCD). The above-mentioned imaging device can be applied to the camera unit 541. The camera unit 541 is suitable as a camera unit that can pick up a wide-angle image and a telescopic image without requiring a mechanical switching mechanism or the like and is built in a thin portable terminal, such as the smartphone 500.

Furthermore, the camera unit 541 can convert image data, which is obtained by imaging, into compressed image data, such as joint photographic coding experts group (JPEG), by the control of the main control unit 501; and can record the compressed image data in the storage unit 550 or can output the compressed image data through the external input/output unit 560 or the wireless communication unit 510. In the smartphone 500 as shown in FIG. 15, the camera unit 541 has been mounted on the same surface as the surface on which the display input unit 520 is mounted. However, the mounting position of the camera unit 541 is not limited thereto, and the camera unit 541 may be mounted on the back surface of the display input unit 520 or a plurality of camera units 541 may be mounted. In a case in which a plurality of camera units 541 are mounted, the camera units 541, which are available to pick up an image, can be switched so that one camera unit can pick up an image alone or the plurality of camera units 541 can also be simultaneously used to pick up an image.

Further, the camera unit 541 can be used for various functions of the smartphone 500. For example, an image, which is acquired by the camera unit 541, can be displayed on the display panel 521, or the image of the camera unit 541 can be used as one operation input of the operation panel 522. Furthermore, when detecting a position, the GPS receiving unit 570 can also detect a position with reference to an image obtained from the camera unit 541. Moreover, it is also possible to determine the direction of the optical axis of the camera unit 541 of the smartphone 500 or to determine the current usage environment with reference to an image obtained from the camera unit 541 without using a triaxial acceleration sensor or by using a triaxial acceleration sensor together. Naturally, an image obtained from the camera unit 541 can also be used in the application software.

[Others]

The heights of the respective light blocking walls of the first and second light blocking walls 12-5 and 14-5 of the lens hood 10-5 of the fifth embodiment have varied in accordance with distances between the light blocking walls and the center of the optical axis, and intervals between the respective light blocking walls have been substantially equal to each other. However, the invention is not limited thereto, and it is preferable that the interval between the adjacent light blocking walls of the first and second light blocking walls is reduced with a reduction in the height of the light blocking wall. When the heights of the first and second light blocking walls are reduced, unnecessary light (oblique light) is likely to be incident. Accordingly, when the interval between the light blocking walls is reduced with a reduction in the height of the light blocking wall, the incidence of the unnecessary light is prevented regardless of the height of the light blocking wall.

Further, the first light blocking wall, which forms the cylindrical outermost periphery, of the lens hood of this embodiment has been formed in a cylindrical shape. However, the first light blocking wall is not limited thereto and may be formed in a prismatic shape. Furthermore, it goes without saying that the number and shapes of the second light blocking walls partitioning the internal space of the first light blocking wall, which forms the outermost periphery, into a plurality of spaces are not limited to this embodiment and can be modified in various ways without departing from the scope of the invention.

What is claimed is:

1. A lens hood that blocks unnecessary light to be incident on a telephoto lens, the lens hood comprising:

a first light blocking wall that forms a cylindrical outermost periphery; and a plurality of second light blocking walls that partition an internal space of the first light blocking wall into a plurality of spaces, wherein each of the first and second light blocking walls is provided in parallel to the traveling direction of a first effective light beam used to form a subject image within an angle of view of the telephoto lens, and blocks first unnecessary light other than the first effective light beam, wherein the lens hood is applied to a reflective telephoto lens that includes a reflective optical system reflecting light flux twice or more, and an angle between a second light blocking wall and an optical axis of the reflective telephoto lens is smaller when a distance between the second light blocking wall and a center of the optical axis of the reflective telephoto lens is greater.

2. The lens hood according to claim 1, wherein the second light blocking wall partitions the internal space of the first light blocking wall in a concentric shape, the shape of a grid, the shape of a honeycomb, or a cylindrical shape.

3. The lens hood according to claim 1, wherein antireflection treatment is performed on a wall surface of each of the first and second light blocking walls.

4. A lens hood that blocks unnecessary light to be incident on a telephoto lens, the lens hood comprising:

a first light blocking wall that forms a cylindrical outermost periphery; and a second light blocking wall that partitions an internal space of the first light blocking wall into a plurality of spaces, wherein each of the first and second light blocking walls is provided in parallel to the traveling direction of a first effective light beam used to form a subject image within an angle of view of the telephoto lens, and blocks first unnecessary light other than the first effective light beam, wherein the lens hood is applied to a multifocal lens that includes a wide-angle lens provided at a central portion and an annular telephoto lens provided at a peripheral portion of the wide-angle lens, and the second light blocking wall is provided only in an annular internal space corresponding to the telephoto lens of the multifocal lens.

5. The lens hood according to claim 4, wherein each of the first and second light blocking walls does not block a second effective light beam, which is used to form a subject image within an angle of view of the wide-angle lens of the multifocal lens, and blocks second unnecessary light other than the second effective light beam.

6. The lens hood according to claim 4, wherein a height of each of the first and second light blocking walls varies in accordance with a distance between each light blocking wall and a center of an optical axis of the multifocal lens, and each of the first and second light blocking walls does not block a second effective light beam, which is used to form a subject image within an angle of view of the wide-angle lens of the multifocal lens, and blocks second unnecessary light other than the second effective light beam.

7. The lens hood according to claim 6, wherein the height of each of the first and second light blocking walls varies in accordance with a distance between each light blocking wall and the center of the optical axis of the multifocal lens, and an interval between adjacent light blocking walls of the first and second light blocking walls is reduced with a reduction in the height.

8. An imaging device comprising:

the lens hood according to claim 4;

the multifocal lens; and a directional sensor that includes a plurality of pixels formed of photoelectric conversion elements arrayed two-dimensionally, pupil-splits light flux to be incident through the wide-angle lens and the telephoto lens of the multifocal lens, and selectively receives light.

9. The imaging device according to claim 8, wherein the directional sensor includes a microlens array or a light blocking mask that functions as a pupil-split part.

* * * * *